United States Patent [19]

Brian et al.

[11] Patent Number: 5,273,804
[45] Date of Patent: Dec. 28, 1993

[54] REINFORCEMENT FOR REINFORCING A PAVED SURFACE

[75] Inventors: Mercer F. Brian; Martin K. Fraser; Brian Orr, all of Lancashire, England

[73] Assignee: Netlon Limited, Blackburn, England

[21] Appl. No.: 882,972

[22] Filed: May 14, 1992

Related U.S. Application Data

[60] Division of Ser. No. 748,523, Aug. 22, 1991, Pat. No. 5,152,633, which is a continuation of Ser. No. 634,807, Dec. 31, 1990, abandoned, which is a continuation of Ser. No. 432,669, Nov. 7, 1989, abandoned.

[30] Foreign Application Priority Data

Nov. 7, 1988 [GB] United Kingdom ............... 8825990

[51] Int. Cl.⁵ .................. B32B 3/10; B32B 27/02; B32B 3/06; B32B 7/10
[52] U.S. Cl. .................. 428/138; 428/131; 428/134; 428/135; 428/137; 428/198; 428/245; 428/255; 428/284; 428/286; 428/299; 428/910
[58] Field of Search ............... 428/131, 134, 136, 138, 428/198, 255, 284, 286, 135, 245, 299, 137, 910

[56] References Cited

U.S. PATENT DOCUMENTS

| | | | |
|---|---|---|---|
| 2,919,467 | 1/1960 | Mercer | 428/255 |
| 3,361,043 | 1/1968 | Beeson et al. | |
| 3,386,876 | 6/1968 | Wychoff | 428/255 |
| 3,566,758 | 3/1971 | Perkins | |
| 3,678,816 | 7/1972 | Hudis | |
| 3,697,347 | 10/1972 | Lehmann | 428/255 |
| 3,913,854 | 10/1975 | McClure | |
| 4,302,495 | 11/1981 | Marra | 428/255 |
| 4,362,780 | 12/1982 | Marzocchi et al. | |
| 4,374,798 | 2/1983 | Mercer | 428/255 |
| 4,574,100 | 3/1986 | Mercer | |
| 4,756,946 | 7/1988 | Mercer | 428/255 |

FOREIGN PATENT DOCUMENTS

| | | |
|---|---|---|
| 6807089 | 11/1969 | Netherlands . |
| 914489 | 1/1963 | United Kingdom . |
| 1029105 | 5/1966 | United Kingdom . |
| 1209523 | 10/1970 | United Kingdom . |
| 1332341 | 10/1973 | United Kingdom . |
| 2002686 | 2/1979 | United Kingdom . |
| 2035191 | 6/1980 | United Kingdom . |
| 2096531 | 10/1982 | United Kingdom . |

OTHER PUBLICATIONS

"Tensar Grid Reinforced Asphalt".
Information Bulletin "Installation Procedure for Continuous Reinforcement of Ashphalt Using 'Tensar' Grids", May 1986.
Civil Engineering, Dec. 1977, "Using Fabrics to the Full", p. 59, 61, 63 and 65.
Ground Engineering, Apr. 1984 "Geotextiles As Earth Reinforcement in the United Kingdom", T. S. Ingold.

Primary Examiner—George F. Lesmes
Assistant Examiner—James D. Withers
Attorney, Agent, or Firm—Jacobson, Price, Holman & Stern

[57] ABSTRACT

To form a paved surface, a laminate is used which has on the bottom a geotextile fabric with the mesh structure on the top. The fabric is adhered to the road base by spraying or spreading a bituminous liquid onto the base and laying on the laminate and applying further adhesive to the top of the laminate; asphalt is then placed and rolled. The laminate is formed of a square or rectangular mesh structure which has oriented stands connected at junctions which are thicker than the strands and have low-orientated or unorientated nodules. On one side the surface of the nodules are melted and the fabric is pressed into the nodules so that the plastics material of the nodules envelopes some of the fibers or filaments of the fabric to form a mechanical bond. In this way, the oriented strands stand proud of the fabric, to enable the asphalt aggregate to penetrate into the meshes and interlock with the strands.

5 Claims, 1 Drawing Sheet

REINFORCEMENT FOR REINFORCING A PAVED SURFACE

This is a divisional application of application Ser. No. 07/748,523, filed Aug. 22, 1991, now U.S. Pat. No. 5,152,633, which is a continuation of application Ser. No. 07/634,807, filed Dec. 31, 1990, now abandoned, which is a continuation of application Ser. No. 07/432,669, filed Nov. 7, 1989, now abandoned.

BACKGROUND OF THE INVENTION

The invention relates to a method of reinforcing a paved surface, and also to a reinforcement for use in the method.

The invention is applicable to paved surfaces in general, but the invention is particularly useful when reinforcing asphalt. "Asphalt" is used herein in the general sense to refer to an aggregate having a hydrocarbon-type binder, which may be for instance natural asphalt or bitumen; the asphalt is normally laid hot and sets on cooling, though cold-mix asphalts can be used. The asphalt can be used on for instance a road or runway, normal practice being to lay an asphalt base course and to place an asphalt wearing course over the base or binder course. The ground is the surface to be covered with a paving layer, and can be any suitable surface, and can eventually be within a multi-layer construction, e.g. within the thickness of a full depth asphalt pavement or road. The ground can be e.g. the surface of a lower layer of asphalt or concrete to be covered with an upper layer of asphalt, or the base or binder course, or the lower part of an old wearing course when refurbishing, or a concrete or lean-mix concrete base or sub-base. Thus the invention can be applied when making a new construction or when refurbishing, for instance, after part or whole removal of the old wearing course, or even directly onto an old wearing course.

In recent years, mesh structures (which are also termed grids) have been incorporated in order to improve the paved surface. The mesh structure can control rutting and reflective cracking (cracking which is initiated in or below the base course). The mesh structure itself is laid onto the ground and is tensioned, the tension being maintained throughout the laying process. Modern practice is to spray the mesh structure and ground with a bituminous emulsion or solvent-based bitumen known as "cut-back", and a layer of small stone chippings is then spread over the surface, becoming adhered to the bitumen. A conventional paving operation can then be carried out to apply a layer of hot asphalt onto the layer of chippings without the tracks or wheels of the asphalt laying machine (called a paviour) coming into contact with the grid. The layer of hot asphalt becomes integrated with the layer of chippings and bitumen, the whole composite being bonded to the road surface through the bitumen. Vertical loads on the new road surface are resolved into horizontal forces, which are then restrained by the grid structure into which the chippings and aggregate from the asphalt layer interlock.

Whilst this procedure is effective, it is complex and relatively expensive because of the number of individual operations necessary. The coating of the ground and mesh structure with bitumen and then spreading a chip coat, is expensive and time consuming.

The mesh structure itself is preferably formed of plastics material, high-strength molecularly oriented polymer structures being used, for instance, a biaxially-oriented mesh in accordance with U.S. Pat. No. 4,374,798. However, other materials such as glass fibre grids, woven or knitted polyester meshes or metal grids may be used.

A commercially-acceptable method is desirable for positioning the mesh structure in the asphalt. In one experimental procedure, the mesh structure was laid on top of the base or binder course and the wearing course placed on top of the mesh structure using a conventional machine; the mesh structure was a biaxially-orientated mesh structure in accordance with U.S. Pat. No. 4,374,798. It was found that if the mesh structure was merely laid on the surface of the base or binder course, the tractive forces and weight of the asphalt laying machine caused the mesh structure to stretch and buckle as the wearing course was laid, resulting in the mesh structure being imprecisely positioned and causing subsequent rucking of the mesh structure and splitting of the asphalt. The mesh structure moves forward in front of the wheels or track of the machine, forming a type of bow wave. This makes it impossible to determine the position of the mesh structure within the wearing course.

THE INVENTION

According to one aspect of the invention, a mesh structure/fabric laminate is adhered to the ground with the fabric lowermost, and aggregate is placed on the laminate to form a reinforced paved surface.

According to a second aspect of the invention, a mesh structure/fabric laminate is produced by providing a plastics material mesh structure comprising oriented strands connected to each other at junctions containing parts which are substantially thicker than the strands, stand proud of the strands, and contain plastics material which is unorientated or of low orientation, melting the surfaces of said thicker parts, and pressing a fabric onto the mesh structure so that the plastics material of said thicker parts envelopes some of the fibres of filaments of the fabric and thereby bonds said thicker parts to the fabric without bonding the strands of the mesh structure to the fabric.

The reinforcing method of the invention makes it unnecessary to tension the mesh structure as it is being laid. Nonetheless, as the laminate is properly retained by adhesion to the ground, the mesh structure does not stretch and does not form bow waves as the asphalt laying machine advances. The fabric provides a good medium for adhering or bonding to the ground, but does not prevent interlock between pieces of aggregate and the mesh structure, which is important for effective reinforcement by the mesh structure. No significant plane of weakness is formed. If, as is preferred, the mesh structure comprises strands and parts which are thicker than the strands, which parts are secured to the fabric to form the laminate, the strands can stand slightly proud of the fabric, which improves interlock.

Using the invention, the normal paving operation can be carried out without the necessity for the application of the chippings to the mesh structure, though some time may be required to allow the adhesive to cure.

The laminate may be adhered to the ground by using a liquid which is sprayed or spread on the ground before laying laminate, and a second application of liquid may be made to the top of the laminate after laying the laminate on the ground. The fabric not only absorbs the liquid, but allows the liquid to pass through the fabric so forming a bond as the liquid cures or sets, and adhering the fabric to the ground. The fabric can be secured firmly to the adhesive by brushing it onto the ground with push brooms or automatic equipment having the same action. Some time must be allowed for curing or setting before proper adhesion is achieved.

The fabric can be of any suitable type, but will have a fibrous or filamentary structure suitable for mechanical interlock with the cured or set adhesive. It should be sufficiently coherent to provide a good bond between the mesh structure and the ground, though the presence of the adhesive in the intesticies of the fabric can achieve this. The preferred fabrics are needled continuous filaments or staple fibres or spun bonded fabrics, but woven or knitted fabrics could be used. The fabric will normally be formed of a plastics material such as polyester. Suitable geotextile fabrics are known.

Any suitable adhesive can be used, and adhesion may be due for instance to a chemical change, solidification on cooling or solidification as a solvent evaporates. The adhesive could be an aqueous based bituminous emulsion or a solvent based bitumen known as "cut-back" or "pure bitumen". The rate of application of the adhesive will depend on the weight of fabric being used and also the standard of finish on the ground on which the fabric is laid, but sufficient needs to be applied to ensure an adequate bond to the ground.

The unit weight of the fabric could be from 80 gms/m$^2$ to 250 gms/m$^2$, but preferably about 130 gms/m$^2$.

The mesh structure can be made from any suitable material by any suitable method, but is preferably made from polypropylene or polyester, and is preferably made by the method described in U.S. Pat. No. 4,374,798. The mesh pitch could be from 30 mm to 100 mm, but preferably is from 40 mm to 75 mm. The weight of the grid structure could be from 150 gms/m$^2$ to 400 gms/m$^2$ but is preferably about 240 gms/m$^2$.

The size of aggregate included in the surface layer will depend on the purpose to which the surface is to be put, but will range from 3 mm to 40 mm as single sizes or in a specified grading range.

The particular laminate of the invention is especially useful in the reinforcing method of the invention—as explained above, the strands can stand slightly proud of the fabric. The plastics material of the thicker parts envelopes some of the fibres or filaments of the fabric, and thus forms a mechanical bond between the mesh structure and the fabric. Provided this is carried out properly and provided the correct mesh structures are used, melting the surfaces of the thicker parts does not weaken the mesh structure significantly.

However, other methods of laminating are possible, such as flame or hot melt adhesives bonding, but it is preferred to avoid any shrinking of oriented strands or adherence of the fabric to strands—thus the flame or the hot melt adhesives are preferably not applied excessively or at all to the strands.

The mesh structures are preferably such as to have pronounced nodules of unorientated or low-orientation plastics material in the junctions, and suitable mesh structures can be made in accordance with U.S. Pat. No. 4,374,798.

PREFERRED EMBODIMENTS

The invention will be further described, by way of example, with reference to the accompanying drawings, which:

FIG. 1

Figure 1:
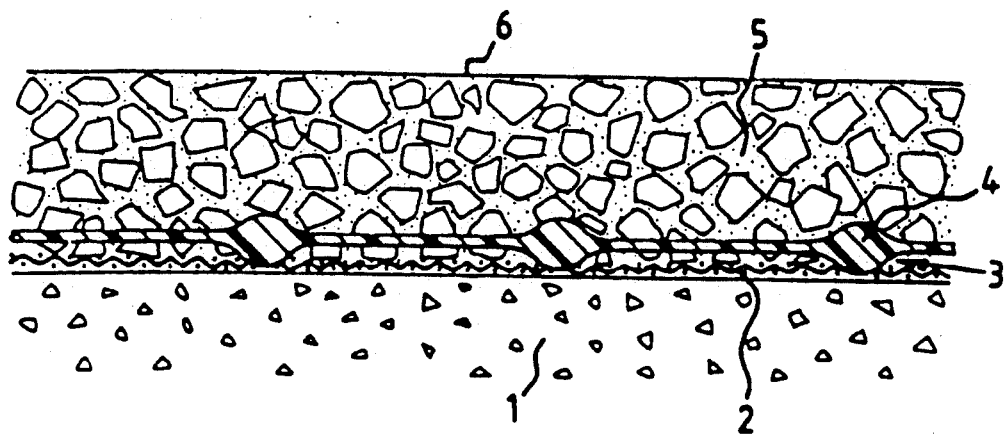
FIG. 1 is vertical section through the paved surface of a road.

FIG. 1 shows a road base 1 which forms the ground to which has been adhered the fabric 2 of a mesh structure/fabric laminate 3 which includes the mesh structure 4. The fabric 2 is lowermost, and has been adhered to the road base 1 in any suitable manner, as discussed above. Aggregate 5 has been placed on the laminate 3, and the pieces of the aggregate 5 pass into the meshes of the mesh structure 4 and interlock with the strands of the mesh structure 4. The aggregate 5 has been subjected to pressure in order to consolidate it, forming a flat road surface 6. Though the strands of the mesh structure 4 may be somewhat pressed down, it is found that some of them stand slightly proud of the fabric 2 and the interlock with the pieces of the aggregate 5.

FIG. 2

Figure 2:
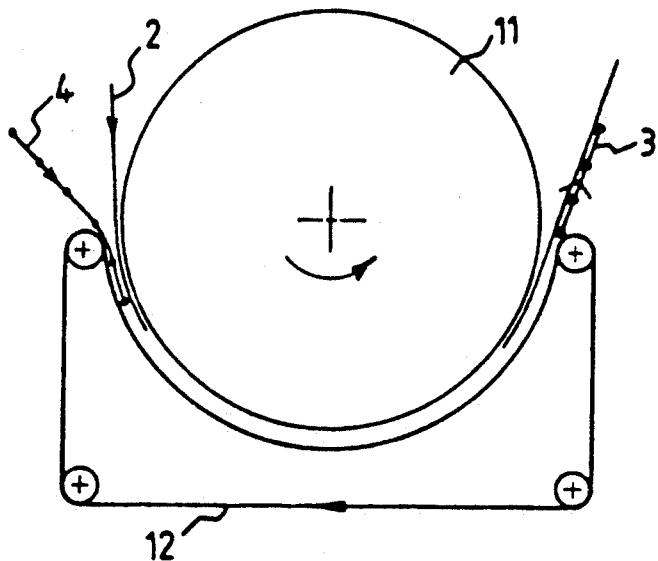
FIG. 2 is schematic view showing the formation of a laminate in accordance with the invention.

FIG. 2 shows a known laminating machine having a heated roll 11 whose lower half is wrapped by a silicone rubber belt 12. A fabric 2 and a plastics material mesh structure 4 are fed between the roll 11 and belt 12 so that the roll 11 heats the high points or nodules (i.e. the thicker parts) of the mesh structure 4 through the fabric 2 and laminates them together to form the laminate 3.

By melting only the surface of nodules of the mesh structure 4 and pressing the fabric 2 onto the nodules, the molten plastics material penetrates the fabric 2 and produces a mechanical bond. Due to the arrangement, the heated roll 11 has little effect on the oriented strands of the mesh structure 4.

EXAMPLE

The machine of FIG. 2 is used to make a laminate.
Mesh structure:

The mesh structure is in accordance with FIG. 21 of U.S. Pat. No. 4,374,798. The mesh structure is a biaxially-oriented mesh structure having rectangular meshes, and formed by oriented strands connected together at junctions. Each junction has a thick unoriented or low-oriented nodule in its centre, surrounded by thinner, more oriented zones. The nodules are much thicker than the strands.

The mesh structure is made of polypropylene, which during manufacture is heat set and thus made resistant to reversion (shrinkage) at asphalt laying temperatures.

| | |
|---|---|
| Grid mesh pitch | 70 mm × 50 mm |
| Grid unit weight | 240 gms/m$^2$ |
| Grid thickness at nodules | 4.4 mm |
| Grid width | 4.0 mtrs |
| Fabric: | |
| Raw material | polyester |
| Fabric constructions | needled continuous filaments |
| Fabric weight | 130 gms/m$^2$ |
| Fabric width | 4.0 m |

The laminate was used as described in relation to FIG. 1 to form a road surface using a conventional asphalt paviours to lay the asphalt. The adhesive was spread on the ground before placing the laminate in position after which further adhesive was applied on top of the fabric. The adhesive was a bituminous aqueous-based emulsion, sprayed on at a rate of 1½ to 2 liters/m² of ground; a lower rate, e.g. 0.8 to 1 liters/m² can be sprayed on if push brooms are used to brush the fabric down onto the adhesive surface or automated lay-down equipment used. The asphalt was a rolled asphalt wearing course (Design Mix), laid as follows:

| | |
|---|---|
| Thickness of layer | 50 mm |
| Aggregate size | 20 mm maximum (graded) |
| Laying temperature | 140°–150° C. |

The present invention has been described above purely by way of example, and modifications can be made within the spirit of the invention.

We claim:

1. A laminate comprising a plastics material grid and a fabric which have been bonded together by a lamination procedure, said grid comprising oriented strands which have not been substantially shrunk during said lamination procedure, said strands being connected to each other at junctions containing zones which are substantially thicker than the strands and contain plastics material which is unoriented or of low orientation; and said fabric comprising fibres or filaments, said fabric being engaged by said thicker zones with said thicker zones enveloping some said fibres or filaments to thereby bond said thicker zones to said fabric, said strands not being substantially bonded to said fabric.

2. The laminate of claim 1, wherein said fibres or filaments have been enveloped by said thicker zones by melting the surfaces of said thicker zones and pressing said fabric onto said mesh structure so that the plastics material of said thicker zones envelopes some said fibres or filaments of the fabric.

3. The laminate of claim 1, wherein said grid is a biaxially-oriented mesh structure having substantially square or rectangular meshes.

4. The laminate of claim 1, wherein said thicker zones are formed by thick nodules which are surrounded by thinner and more-orientated zones, only the surfaces of said nodules being melted and bonded to said fabric.

5. A laminate comprising a plastics material grid and a fabric which have been bonded together by a lamination procedure, said grid comprising oriented strands which have not been substantially shrunk during said lamination procedure, said strands being connected to each other at junctions containing zones which are substantially thicker than the strands, stand proud of the strands and contain plastics material which is unoriented or of low orientation; and said fabric comprising fibres or filaments, said fabric being engaged by said thicker zones with said thicker zones enveloping some said fibres or filaments to thereby bond said thicker zones to said fabric, said strands not being substantially bonded to said fabric.

* * * * *